(No Model.)  2 Sheets—Sheet 1.

O. WAIBEL.
PICTURE BLOCK.

No. 510,216. Patented Dec. 5, 1893.

Witnesses,
C. H. Annse
J. A. Bayless

Inventor
Oscar Waibel
By Dewey & Co.
Attys (No Model.) 2 Sheets—Sheet 2.

O. WAIBEL.
PICTURE BLOCK.

No. 510,216. Patented Dec. 5, 1893.

Witnesses,
Inventor,
Oscar Waibel
By Dewey & Co.
Att'ys

UNITED STATES PATENT OFFICE.

OSCAR WAIBEL, OF SAN FRANCISCO, CALIFORNIA.

PICTURE-BLOCK.

SPECIFICATION forming part of Letters Patent No. 510,216, dated December 5, 1893.

Application filed June 8, 1893. Serial No. 476,967. (No model.)

*To all whom it may concern:*

Be it known that I, OSCAR WAIBEL, a citizen of the United States, residing in the city and county of San Francisco, State of California, have invented an Improvement in Picture-Blocks; and I hereby declare the following to be a full, clear, and exact description of the same.

My invention relates to the general class of picture blocks, and it consists essentially in a series of independent blocks united by a flexible connection, whereby the blocks may be turned into various positions with relation to each other to form figures and designs of varied character.

The object of my invention is to provide blocks, which by reason of their connection, can be turned into many positions to afford both amusement and instruction, and particularly the provision of an interesting puzzle somewhat difficult of solution, but adapted when solved to give both instruction and interest.

Figure 1:
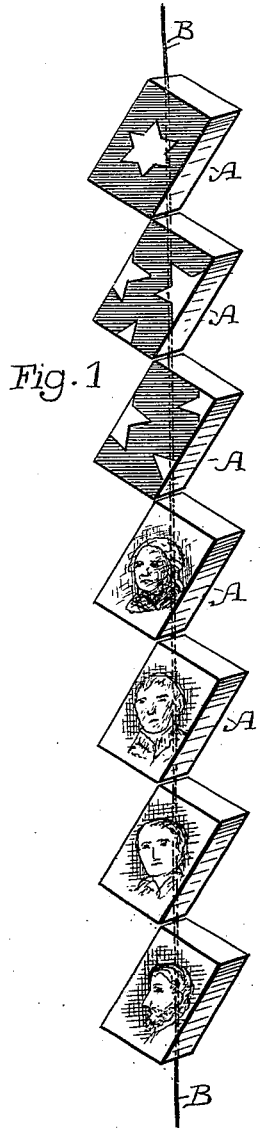
Figure 2:
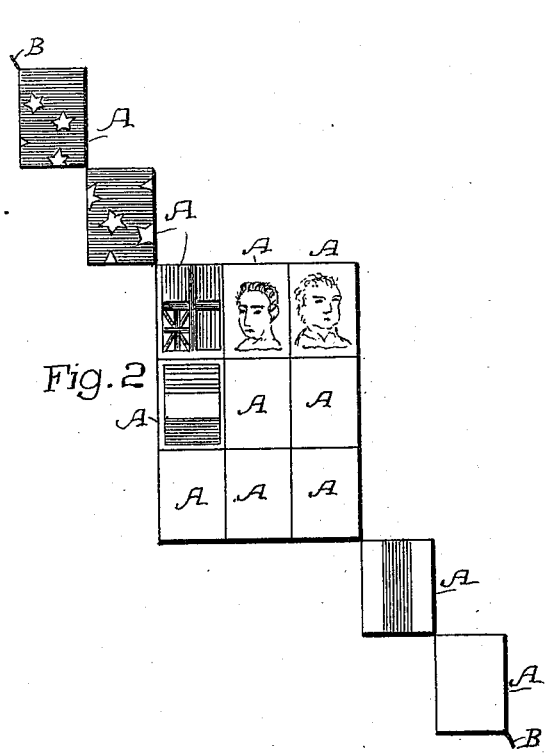
Figure 3:
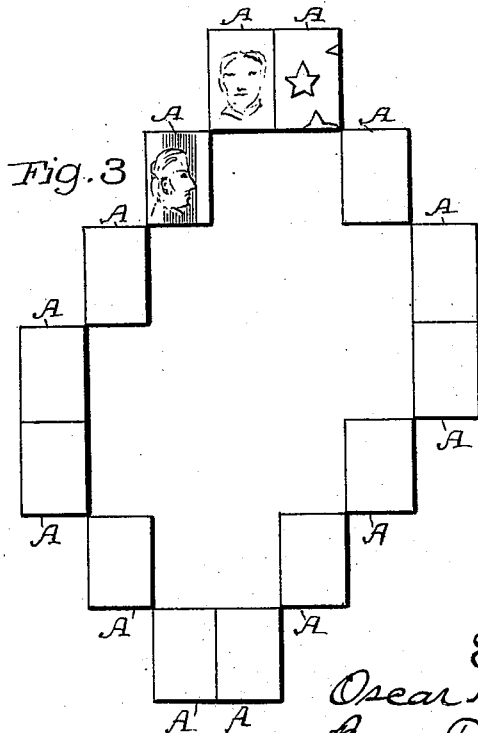
Figure 4:
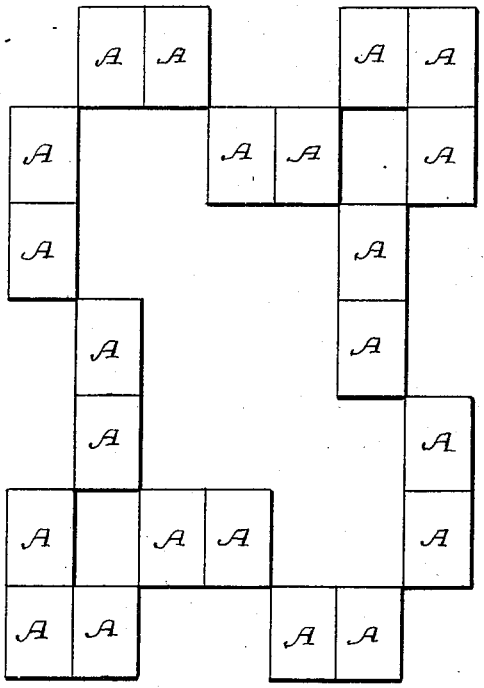
Figure 5:
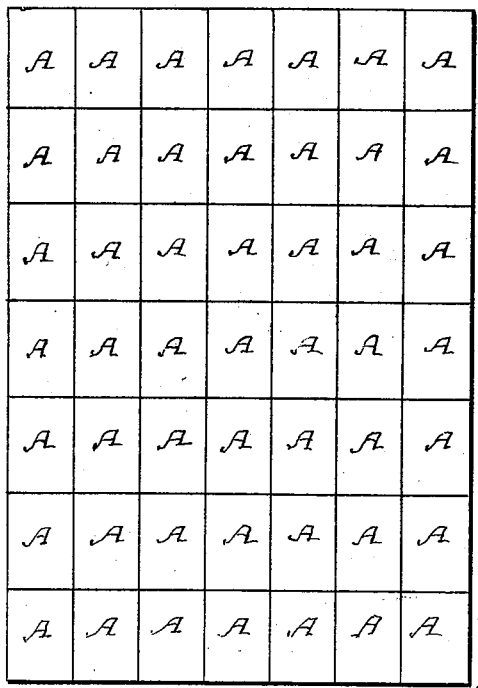

Referring to the accompanying drawings for a more complete explanation of my invention,—Figure 1 is a perspective view, showing a series of flexibly united or connected blocks. Fig. 2 is a diagram showing one series of blocks bent into a certain design. Fig. 3 shows similarly another design. Fig. 4 shows a third design. Fig. 5 is a diagrammatic figure showing the union of these three designs, said Figs. 2 to 5 inclusive being illustrative of one of the uses of the flexibly connected blocks.

A are blocks of any suitable shape. I have here shown them as oblong, to suit the particular illustrative design. These blocks are connected successively by a flexible string, cord, wire, or other connection B adapting them to be turned into varied relations to each other, to form a number of designs. The point of connection may be varied, but to gain the highest efficiency, the blocks should be connected through their diagonal planes as shown, whereby their proper final relationship to each other, is rendered more a matter of guess and experiment, to form the particular design for which any particular set of blocks may be intended.

The blocks may have their surfaces provided with pictures or colors, or characters, or other designs, the object being to so ornament them that each shall bear only a portion of a design, which, as a whole, can only be formed by the proper laying up of the blocks with relation to each other. Thus, for example, one side of the blocks may bear portions of a design which, when completed by the proper arrangement of the blocks, will be a star spangled banner, with the stars and stripes and pictures of the Presidents of the United States, and other suitable ornamental characters; and the other side of the blocks may bear portions of a design which, when complete, will represent the American flag, the stripes bearing the standards and flags of all nations. These are mere suggestions, not necessary to illustrate, but which show the object and utility of the series of flexibly connected blocks.

In Fig. 2 is shown one series of blocks which, when bent into the design shown, is capable of being united with the two other designs of Figs. 3 and 4, which are separate strings of blocks, into the general oblong design of Fig. 5 which will represent the contour of the completed puzzle.

The difficulty of forming the strings of blocks into the designs necessary to be laid up into a consistent whole furnishes the interest in the puzzle.

It will be understood that the term "picture" as applied to the blocks, is simply indicative of distinguishing marks of any character upon them, by which they may be laid up together to form a stated design.

Having thus described my invention, what I claim as new, and desire to secure by Letters Patent, is—

1. Picture blocks united at their corners by flexible connections whereby they may be laid up together in various relations, substantially as herein described.

2. Picture blocks united by flexible connections passing through their diagonal planes whereby they may readily be laid up together in various relations, substantially as herein described.

3. A picture block puzzle consisting of a plurality of independent series of blocks, the members of each series being united at their corners by flexible connections whereby said members may be laid up in varying relations to each other and to the members of the other series, substantially as herein described.

4. A picture block puzzle consisting of a plurality of independent series of blocks, the members of each series being united by flexible connections through their diagonal planes, whereby said members may be laid up in varying relations to each other and to the members of the other series, substantially as herein described.

In witness whereof I have hereunto set my hand.

OSCAR WAIBEL.

Witnesses:
S. H. NOURSE,
WM. F. BOOTH.